United States Patent
Xu

(10) Patent No.: US 11,069,052 B2
(45) Date of Patent: Jul. 20, 2021

(54) DAMAGE IDENTIFICATION RESULT OPTIMIZATION METHOD AND APPARATUS

(71) Applicant: Advanced New Technologies Co., Ltd., George Town (KY)

(72) Inventor: Juan Xu, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/156,198

(22) Filed: Jan. 22, 2021

(65) Prior Publication Data

US 2021/0174493 A1 Jun. 10, 2021

Related U.S. Application Data

(63) Continuation of application No. PCT/CN2019/098545, filed on Jul. 31, 2019.

(30) Foreign Application Priority Data

Sep. 26, 2018 (CN) .......................... 201811122031.9

(51) Int. Cl.
*G06K 9/00* (2006.01)
*G06T 7/00* (2017.01)
*G06N 3/04* (2006.01)
*G06N 7/00* (2006.01)
*G06T 7/11* (2017.01)
*G07C 5/08* (2006.01)

(52) U.S. Cl.
CPC .......... *G06T 7/0006* (2013.01); *G06N 3/049* (2013.01); *G06N 7/005* (2013.01); *G06T 7/11* (2017.01); *G07C 5/0808* (2013.01)

(58) Field of Classification Search
None
See application file for complete search history.

(56) References Cited

U.S. PATENT DOCUMENTS

2017/0293894 A1* 10/2017 Taliwal ............. G06K 9/00671
2018/0129938 A1* 5/2018 Xiong ...................... G06N 3/08
2018/0165541 A1* 6/2018 Amico ................. G06K 9/6212
2018/0293806 A1* 10/2018 Zhang ............. G06Q 10/06313

OTHER PUBLICATIONS

Kim, Chanho, Fuxin Li, and James M. Rehg. "Multi-object tracking with neural gating using bilinear lstm." Proceedings of the European Conference on Computer Vision (ECCV). 2018. (Year: 2018).*

* cited by examiner

*Primary Examiner* — Hadi Akhavannik
(74) *Attorney, Agent, or Firm* — Shun Yao; Park, Vaughan, Fleming & Dowler LLP

(57) ABSTRACT

One embodiment provides a system and method for vehicle damage identification. During operation, the system obtains, a vehicle image and generates, based on a damage identification model and the obtained vehicle image, an initial damage identification result, which indicates a location of identified vehicle damage. The system displays the initial damage identification result, receives a modification to the initial damage identification result, and generates an updated damage identification result by inputting the damage identification result, image feature information extracted from the vehicle image, and the received modification to a long short-term memory (LSTM) model.

30 Claims, 13 Drawing Sheets

DAMAGE IDENTIFICATION RESULT OPTIMIZATION METHOD AND APPARATUS

RELATED APPLICATION

Under 35 U.S.C. § 120 and § 365(c), this application is a continuation of PCT Application No. PCT/CN2019/098545, entitled "DAMAGE IDENTIFICATION RESULT OPTIMIZATION METHOD AND APPARATUS," by inventor Juan Xu, filed 31 Jul. 2019, which claims priority to Chinese Patent Application No. 201811122031.9, filed on 26 Sep. 2018.

TECHNICAL FIELD

Embodiments of the specification relate to the field of vehicle damage determination, and in particular to method and apparatus for optimizing damage identification result.

BACKGROUND

In a conventional auto insurance claim scenario, an insurance company needs to send professional investigation and damage determination staff to a scene of an accident in order to perform on-site investigation and damage determination, provide a repair scheme and a compensation amount for the vehicle, and capture scene photos. Damage determination photos are archived to allow back-end inspectors to perform damage verification and assessment. Because manual inspection and damage determination are needed, the insurance company needs to invest a large amount of labor costs and training costs of professional knowledge. From the point of view of an ordinary user's experience, a claim cycle can last as long as 1-3 days, because a claim process includes waiting for an inspector to take photos on site, damage determination personnel to perform damage determination at a repairing site, damage verification personnel to verify damage at the backend. The waiting period of the user is a long, and the experience is poor.

Regarding the huge labor costs mentioned in the background, artificial intelligence and machine learning are expected to be applied to the vehicle damage determination scenarios in hope that the computer vision image identification technology in the field of artificial intelligence can be used to automatically identify, according to on-site damage images captured by an ordinary user, a vehicle damage status reflected in the images, and automatically provide a repair scheme. In this way, manual inspection, damage determination, and damage verification are no longer needed, thereby greatly reducing costs of insurance companies, and improving auto insurance claim experience of ordinary users.

However, current intelligent damage determination solutions and damage identification accuracy need to be improved. Therefore, an improved solution is needed so as to further optimize a vehicle damage identification result, and improve identification accuracy.

SUMMARY

In the damage identification result optimization method provided in the specification, on the basis of a recurrent neural network, a previous damage identification result and information of interaction with a user are used as input, so as to realize the optimization of the damage identification result.

According to a first aspect, a system and method for vehicle damage identification are provided. During operation, the system obtains, a vehicle image and generates, based on a damage identification model and the obtained vehicle image, an initial damage identification result, which indicates a location of identified vehicle damage. The system displays the initial damage identification result, receives a modification to the initial damage identification result, and generates an updated damage identification result by inputting the damage identification result, image feature information extracted from the vehicle image, and the received user modification to a long short-term memory (LSTM) model.

In a variation on this embodiment, the damage identification model comprises a convolutional neural network (CNN). The system further obtains a plurality of historical vehicle images labeled with damage identification results and uses the plurality of historical vehicle images as training samples to train the CNN.

In a variation on this embodiment, the initial damage identification result further comprises a damage classification corresponding to the identified vehicle damage; the modification comprises modifying a damage box associated with the identified vehicle damage and/or modifying the damage classification; and modifying the damage box comprises at least one of: deleting, adding, moving, reducing, and amplifying.

In a further variation, the modification comprises modifying the damage box, and generating the updated damage identification result comprises: generating, based on the damage identification model, candidate damage boxes; modifying the candidate damage boxes based on the received user modification; and determining updated damage boxes based on similarities among the candidate damage boxes.

In a further variation, determining the updated damage box comprises: selecting an arbitrary first candidate damage box from the modified candidate damage boxes; determining a plurality of similarities between the selected arbitrary first candidate damage box and other candidate damage boxes in the modified candidate damage boxes; determining whether the first candidate damage box is abnormal based on a prediction model comprised in the LSTM; and in response to the first candidate damage box being not abnormal, including the first candidate damage box in the updated damage boxes.

In a further variation, determining the plurality of similarities between the selected arbitrary first candidate damage box and other candidate damage boxes comprises: calculating a dot product of a first feature vector corresponding to the first candidate damage box and each of a plurality of other feature vectors corresponding to the plurality of other candidate damage boxes.

In a further variation, the system trains the prediction model using positive samples and negative samples. The positive samples comprise a plurality of damage regions labeled as true damage; and the negative samples comprise a plurality of damage regions labeled as true damage and at least one region labeled as false damage.

In a further variation, the prediction model is a linear regression model.

In a further variation, the initial damage identification result comprises a plurality of damage boxes; the received modification comprises deleting a first damage box from the plurality of damage boxes; and generating the updated damage identification result comprises: determining a plurality of similarities between the first damage box and a plurality of other damage boxes; and in response to determining that a similarity corresponding to a second damage box is less than a predetermined threshold, including the second damage box in the updated damage identification result.

In a variation on this embodiment, the system obtains first image feature information of a first vehicle image and a first damage identification result corresponding to the first vehicle image and obtains second image feature information of a second damage image and a second damage identification result corresponding to the second vehicle image. The system further updates the second damage identification result by inputting the first damage identification result, the first image feature information, the second image feature information, and the second damage identification result to the LSTM model.

In a further variation, the first image feature information and the second image feature information are separately extracted using the damage identification model.

In a further variation, the first damage identification result and the second damage identification result are initial damage identification results separately determined based on the damage identification model; or the first damage identification result and the second damage identification result are updated damage identification results separately determined based on the LSTM model.

In a further variation, the second damage identification result comprises a first damage box; and wherein updating the second damage identification result comprises: performing a region matching and positioning operation to determine, from the first vehicle image, a matching region matching the first damage box; and updating a classification of the first damage box according to the matching region.

In a further variation, the system further updates the first damage identification result by inputting the further updated second damage identification result, the second image feature information, the first damage identification result, and the first image feature information to the LSTM model.

In a further variation, the second damage identification result comprises a first damage box. Updating the second damage identification result comprises: performing a region matching and positioning algorithm to determining, from the first vehicle image, a matching region matching the first damage box; and updating a classification of the first damage box according to the matching region. Updating the first damage identification result comprises: updating at least one damage box in the first damage identification result according to the matching region.

According to a second aspect, a damage identification result optimization apparatus is provided, applied to processing of a single image. The apparatus comprises: an acquisition unit, for acquiring a vehicle damage image inputted by a user; an extraction unit, used to, on the basis of a previously trained damage identification model, extract image feature information; a determining unit, used to determine a damage identification result corresponding to the vehicle damage image, the damage identification result comprising at least a damage box; a display unit, used to display the damage identification result to the user; a receiving unit, used to receive a modification made by the user on the basis of the damage identification result; and an optimization unit, used to, on the basis of a previously trained long short-term memory (LSTM) network, use the damage identification result, the image feature information, and the modification as input, and acquire the optimized damage identification result.

According to a third aspect, a damage identification result optimization apparatus is provided, applied to processing of a plurality of images. The apparatus comprises: an acquisition unit, used to acquire first image feature information of a first vehicle damage image and a first damage identification result corresponding to the first vehicle damage image, and acquire second image feature information of a second vehicle damage image and a second damage identification result corresponding to the second vehicle damage image; and a first optimization unit, used to, on the basis of a previously trained long short-term memory (LSTM) network, use the first damage identification result, the first image feature information, the second image feature information, and the second damage identification result as input, and acquire an optimized second damage identification result.

According to a fourth aspect, a computer-readable storage medium is provided, on which a computer program is stored, wherein the computer program, when executed by a computer, causes the computer to perform the method according to the first aspect or the second aspect.

According to a fifth aspect, a computing device is provided, comprising a memory and a processor, characterized in that the memory stores executable code, and the processor, when executing the executable code, implements the method according to the first aspect or the second aspect.

In the damage identification result optimization method for a single image disclosed by the embodiments of the specification, firstly, image feature information is extracted on the basis of a single damage determination image captured by a user, and a damage identification result is preliminarily identified; then, data of a modification made by the user to the damage identification result is received; further, on the basis of a previously trained LSTM, the extracted image feature information, the preliminarily identified damage identification result, and the data of the modification made by the user are used as input to update the damage identification result. If the user is still not satisfied with the updated damage identification result, another modification can be made until the user is satisfied with a damage determination result.

BRIEF DESCRIPTION OF THE DRAWINGS

To more clearly describe the technical solutions of the plurality of embodiments disclosed by the specification, the following briefly introduces the accompanying drawings for describing the embodiments. It is apparent that the accompanying drawings described below are only the embodiments disclosed by the specification, and a person of ordinary skill in the art can still derive other drawings from these accompanying drawings without creative efforts.

DETAILED DESCRIPTION

Figure 1:
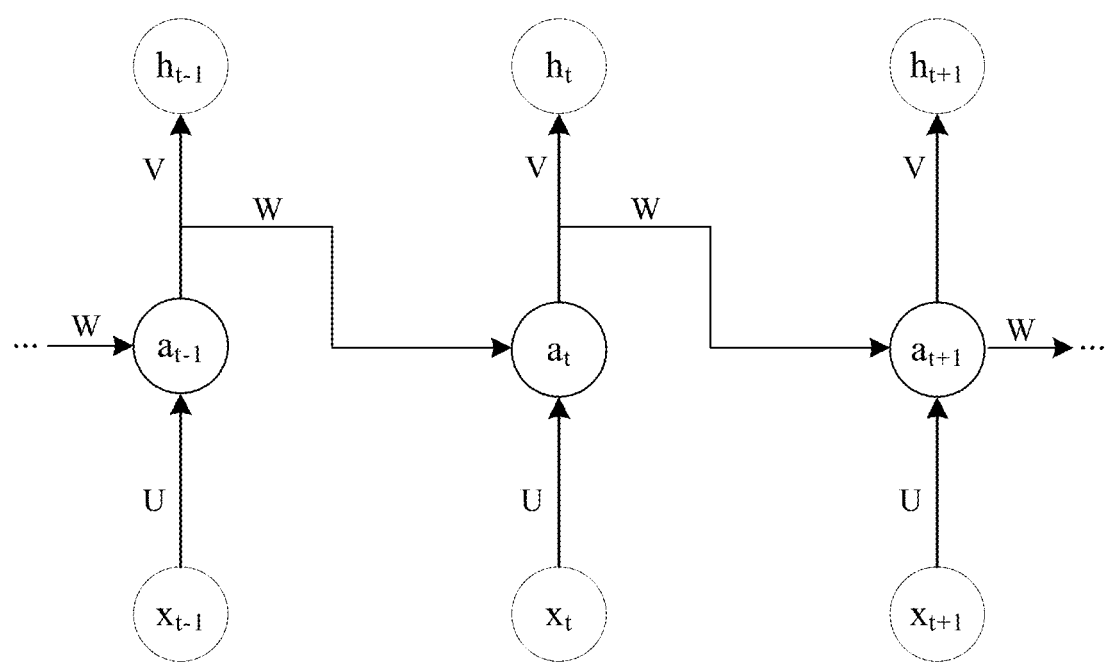
FIG. 1 shows a time sequence diagram of neurons in an LSTM according to an embodiment.

A plurality of embodiments disclosed by the specification are described below with reference to the accompanying drawings.

Embodiments of the specification disclose a damage identification result optimization method. The inventive concept of the method is firstly introduced below.

In order to perform identification on a damage status in a vehicle damage determination image, a method widely used in the industry is to compare the same with a huge amount of historical data in a database to acquire a similar image similar, so as to determine a damaged component in the image and an extent of damage. However, such a method has a less ideal damage identification success rate. In addition, some damage identification models are trained by using a sample labeling method, so as to perform vehicle damage identification. During the process of damage identification, due to effects of a variety of factors such as illumination, stains, a shooting angle, a distance, a vehicle model, and the like, the damage identification success rate is not high enough. For example, in an identification result, it is very likely that true damages can be correctly detected, and a small portion of reflecting spots or stains are also detected as damages, thereby resulting in wrong detections.

In addition, a damage identification model is usually used in a damage determination client, so that an ordinary user can capture an on-site damage image, and upload the on-site damage image to the damage determination client, thereby implementing automated damage determination. Since an accuracy rate of the existing damage identification model is not high enough, the user may not be satisfied with the damage identification result. In this case, the user usually shoots additional photos or replaces some of photos, and uploads photos to the damage determination client, so that damage determination is performed again. The client usually uses all updated photos as input, and performs damage determination again. Such repeated operations may still fail to satisfy the user. In addition, a large quantity of resources is consumed, and the user needs to spend a large amount of time.

In order to rapidly acquire a damage identification result satisfying a user, the inventor thinks that feedback data of the user regarding a damage identification result can be acquired by means of interaction with the user, and the damage identification result can be updated with reference to the feedback data.

Further, a long short-term memory (LSTM) network can be used to process time sequence information. Specifically, computing units, such as neurons, in the LSTM can memorize previous information, and use the same as subsequent input. Specifically, refer to the time sequence diagram of neurons in the LSTM shown in FIG. 1. For a certain neuron, $x_{t-1}$, $x_t$, and $x_{t+1}$ respectively represent input at a time $t-1$, a time t, and a time $t+1$; $a_1$, $a_2$, and $a_3$ respectively represent statuses of the neuron at the time $t-1$, the time t, and the time $t+1$; $h_{t-1}$, $h_t$, and $h_{t+1}$ respectively represent output at the time $t-1$, the time t, and the time $t+1$. Wherein:

$$a_t = g(U^* x_{t-1} + W^* h_{t-1} + b_a) \tag{1}$$

$$h_t = f(V^* a_{t-1} + b_h) \tag{2}$$

$$a_{t+1} = g(U^* x_t + W^* h_t + b_a) \tag{3}$$

$$h_{t+1} = f(V^* a_t + b_h) \tag{4}$$

It can be seen from FIG. 1 that the output $h_t$ at the time t depends on both the output $h_{t-1}$ of a previous time and the current input $x_t$. Therefore, the damage identification result can be updated by using the characteristic that the LSTM can process time sequence information in combination with a feedback of the user made by modifying the damage identification result. In this way, feedback data of the user is used, and previously determined damage data is also used, so as to more rapidly and accurately update a damage identification result, thereby satisfying the user.

Figure 2:
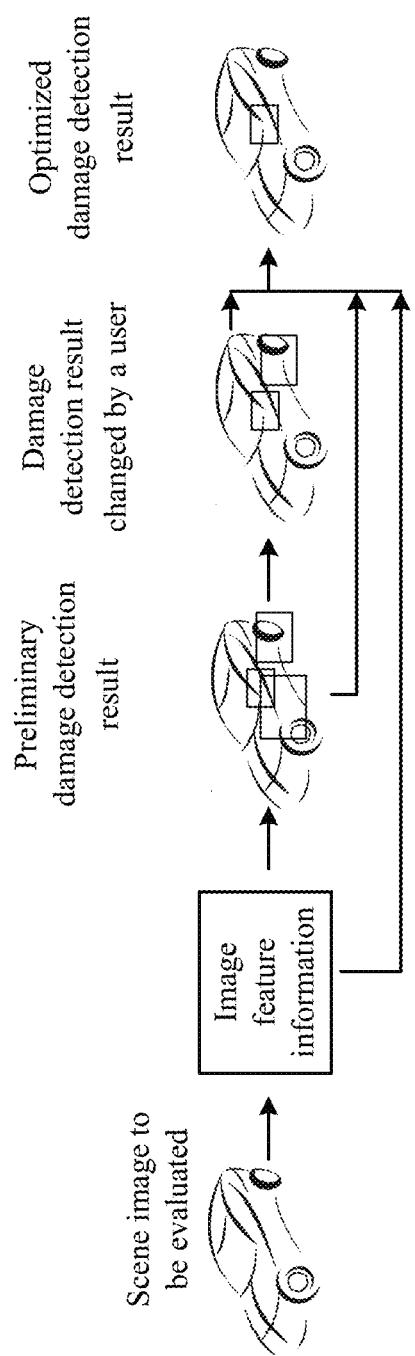
FIG. 2 is a schematic diagram of an application scenario according to an embodiment disclosed in the specification.

FIG. 2 is a schematic diagram of an application scenario according to an embodiment disclosed in the specification. As shown in FIG. 2, a vehicle damage image is firstly inputted to a damage identification model to be subjected to damage identification. The damage identification model extracts feature information of the image. In addition, if the image includes a variety of damage, such as deformations, scratches, and the like, the identification model usually identifies, from the image, a plurality of candidate damage regions as detection results. According to an embodiment of the specification, a modification inputted by the user is received, and the detection results are updated on the basis of the modification data and the image feature information of the vehicle damage image extracted by means of the damage identification model, until the user is satisfied. A specific damage identification result optimization process is described below.

Figure 3:
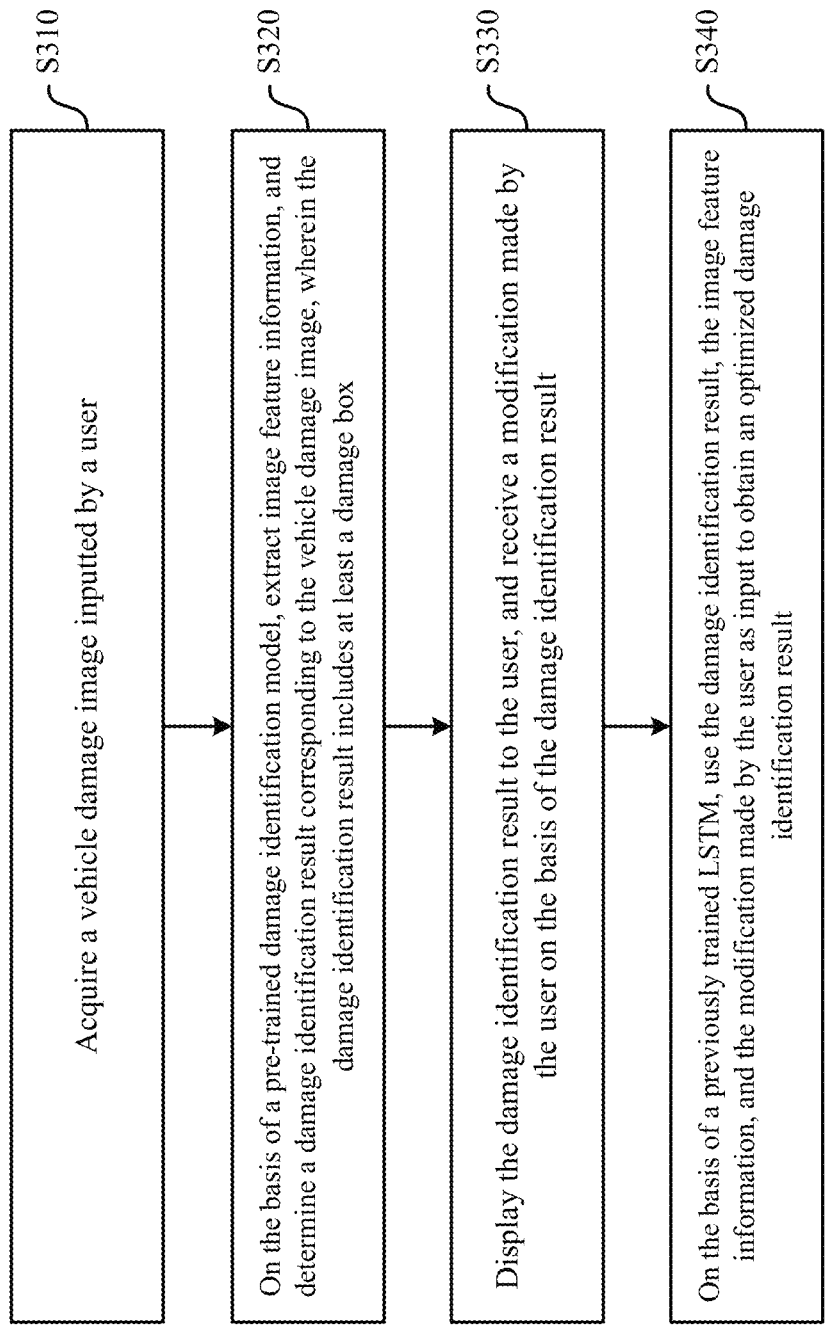
FIG. 3 shows a flowchart of a damage identification result optimization method according to an embodiment.

FIG. 3 shows a flowchart of a damage identification result optimization method according to an embodiment. The method is used to process a single image, and its executive body can be a device having a processing capability: a server, a system, or an apparatus. As shown in FIG. 3, a process of the method includes the following steps: step S310, acquire a vehicle damage image inputted by a user; step S320, on the basis of a previously trained damage identification model, extract image feature information, and determine a damage identification result corresponding to the vehicle damage image, the damage identification result including at least a damage box; step S330, display the damage identification result to the user, and receiving a modification made by the user on the basis of the damage identification result; and step S340, on the basis of a previously trained LSTM, use the damage identification result, the image feature information, and the modification made by the user as input, and acquire the optimized damage identification result. The following describes execution of each of the aforementioned steps.

Firstly, in step S310, a vehicle damage image inputted by a user is obtained. It can be understood that this image can be an image of a vehicle damage scene captured by an ordinary user, and it is an image to be subjected to damage identification.

Figure 4A:
FIG. 4a shows an example of a vehicle damage image.

FIG. 4a shows an example of a vehicle damage image. This image is an on-site image captured by an ordinary user, and is not yet processed.

Then, in step S320, on the basis of a previously trained damage identification model, image feature information is extracted, and a damage identification result corresponding to the vehicle damage image is determined, the damage identification result including at least a damage box.

In an embodiment, the damage identification model is previously trained on the basis of the following steps: firstly, acquire a plurality of historical vehicle damage images labeled with damage identification results; and then, on the basis of a convolutional neural network (CNN), use the plurality of historical vehicle damage images as training samples to train the damage identification model. In a specific embodiment, the labeled damage identification result includes a damage box, that is, includes a bounding box and a damage classification of a damaged object, namely the classification of the damaged object in the bounding box. Correspondingly, a damage identification result acquired on the basis of this model includes a damage box and a damage classification. Further, the damage identification result labeled thereby can also include a damage segmentation result, such as outline information or mask information of the damage. Correspondingly, the damage identification result acquired by this model can further include a damage segmentation result.

In an embodiment, after the vehicle damage image is inputted into the damage identification model, the model firstly extracts image feature information, and then generates a damage identification result on the basis of the image feature information. In a specific embodiment, the image feature information can include a feature map generated on the basis of a CNN. Further, on the basis of this feature map, feature information of a region of interest (ROI) can be collected; then, damage classification, bounding box regression, and segmentation are performed; then, a damage identification result is determined. In another specific embodiment, the image feature information can further include, in addition to the feature map, information of other layers in the CNN network, such as feature information of an ROI or feature information of a candidate damage box.

According to the above, the damage identification result corresponding to the vehicle damage image can be preliminary determined. Subsequently, in step S330, display the damage identification result to the user, and receive a modification made by the user on the basis of the damage identification result.

It should be noted that, after the user reviews the preliminary determined damage identification result, and if the user agrees with the damage identification result, then the user can perform a confirmation operation on the result. In response to the confirmation operation, this result can be directly used as a final result of the corresponding vehicle damage image in the single-image damage identification stage, and the current process ends.

According to another aspect, if the user is not satisfied with the damage identification result, then he can modify the damage identification result. In an embodiment, the damage identification result can include a damage box, and a corresponding modification can include modifying the damage box, such as deleting, adding, moving, zooming out, zooming in, and the like. Further, in a specific embodiment, the damage identification result further includes a damage classification corresponding to the damage box, and the corresponding modification can include modifying the damage classification.

Figure 4B:
FIG. 4b shows an example of a damage identification result identified by a damage identification model.
Figure 4C:
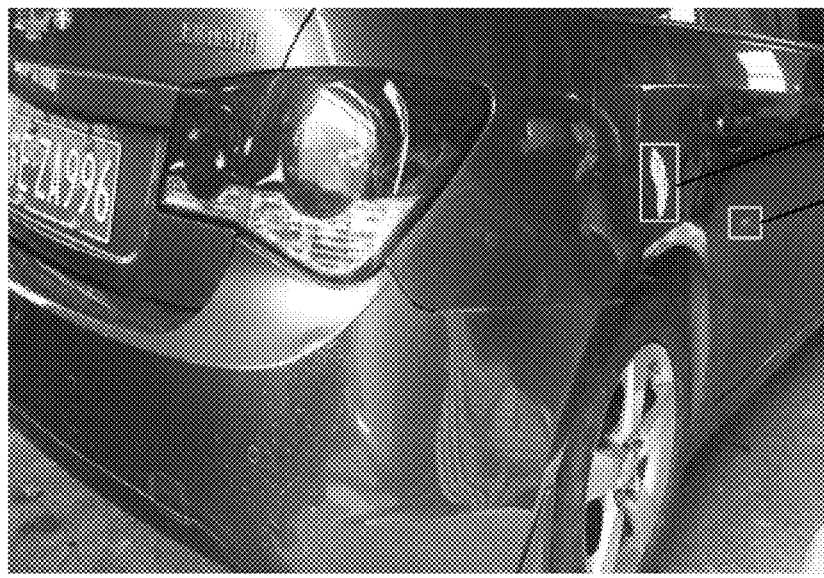
FIG. 4c shows a damage identification result modified by a user.

According to a specific example, as shown in FIG. 4b, which includes a damage identification result, determined on the basis of a damage identification model, of the vehicle damage image in FIG. 4a, namely three damage boxes and corresponding damage classifications. Further, assuming that the user thinks that the damage box on a right rear vehicle door is actually a light reflection, not deformation damage, so that this damage box can be deleted, and the damage classification corresponding thereto is deleted accordingly. As shown in FIG. 4c, the figure shows an interface of the damage identification result modified by the user. It can be seen that the user's modification includes deleting the damage box of which the damage classification is a moderate deformation on a right rear vehicle door.

According to the above, the image feature information extracted on the basis of the damage identification model, the damage identification result determined on the basis of the image feature information, and data of the modification made by the user to the damage identification result can be acquired. Then, in step S340, on the basis of a previously trained LSTM, use the damage identification result, the image feature information, and the change made by the user as input, and acquire the optimized damage identification result.

Figure 5:
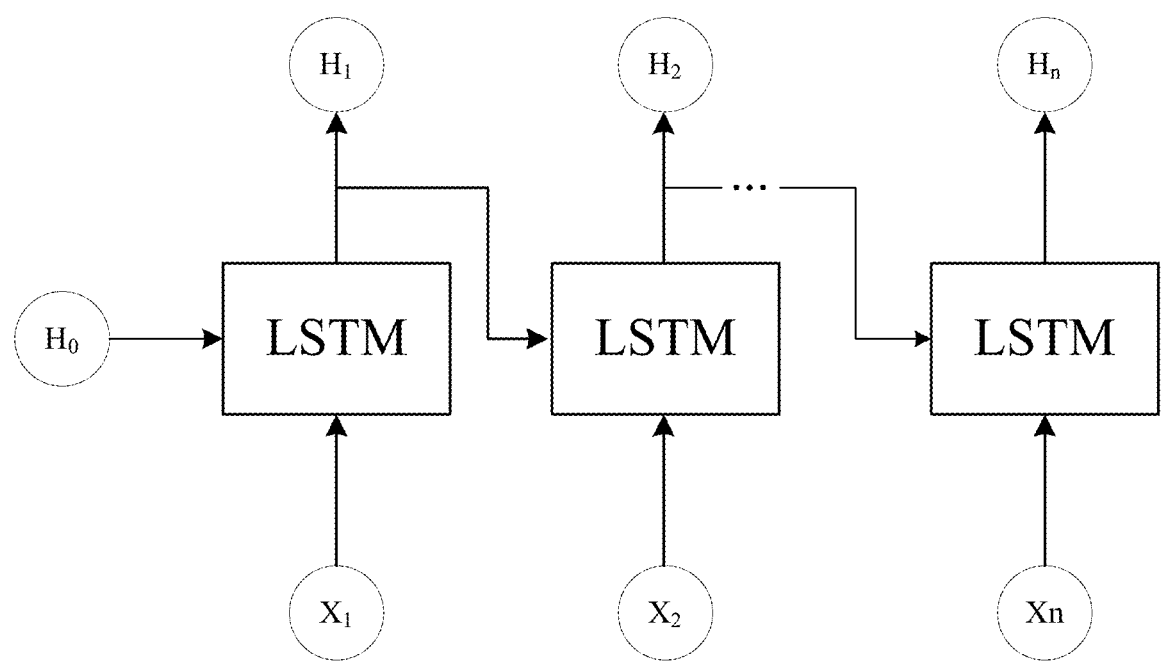
FIG. 5 shows a schematic time sequence diagram of an LSTM in operation according to an embodiment.

In an embodiment, as shown in FIG. 5, $H_0$ represents a preliminary damage identification result determined on the basis of the damage identification model; $X_1$ represents the image feature information, and, at this time, the user made no modification, so that outputted $H_1$ is still the preliminary damage identification result; further, $X_2$ represents the image feature information and a modification made by the user on the basis of the preliminary damage identification result; the optimized damage identification result $H_2$ can be acquired by inputting $H_1$ and $X_2$ to the previously trained LSTM.

Further, another modification made by the user to the damage identification result can be subsequently received, and this modification and the image feature information are used as $X_n$; $X_n$ and the damage identification result $H_{n-1}$ on which this modification is based are inputted to the LSTM, so as to acquire the corresponding optimized identification result $H_n$.

It should be noted that the process of pre-training the LSTM is similar to the process of using the trained LSTM, and a difference lies in that in the process of training the LSTM, a large number of vehicle damage samples labeled with damage identification results are needed for usage, and the LSTM is trained in combination with data interaction with a staff member. Therefore, for the training process of the LSTM, reference can be made to a process of using the same, which will be described below, and details will not be described herein again.

In addition, consider that damage made to a plurality of positions on a vehicle body surface by one collision or scratch accident usually has similar visual features. For example, the damage has substantially the same height, and the mark is substantially continuous, or colors attached thereon due to scratching are the same. In addition, light reflection spots, stains, and so on, which are likely to be mistaken as damage, usually have similar visual effects. According to this feature, it is suggested that an attention mechanism is introduced during the process of using the LSTM to optimize the damage identification result, so as to further optimize the damage detection result.

The attention mechanism is a concept commonly used in natural language processing. During natural language processing, when the meaning of a word or a sentence needs to be understood, contextual information plays a critical role, and can facilitate accurate understanding of a word or a sentence. However, contexts in different positions have different effects on a current word or sentence to be processed, and "attention" to be paid is therefore different. In addition, a context having the greatest effect on the current word or sentence is not in a fixed position, because the context may be before or after the current word or sentence, and with an uncertain distance. Therefore, the attention mechanism is needed in order to solve such a problem.

The attention mechanism can also be applied in the field of image processing. For example, the mechanism can be used to learn and determine, in an image, which regions are critical to identification of a current object, namely regions to which more attention needs to be paid.

On the basis of the capability of the LSTM in processing a data sequence and the characteristic of the attention mechanism, in one or a plurality of embodiments of the specification, with reference to the idea of the attention mechanism, for a plurality of damage boxes identified by the damage identification model, attention is paid to a similarity between a certain damage box and other damage boxes, so as to remove an abnormal region (outlier) and optimize the damage detection result.

In an embodiment, the damage identification result includes a plurality of damage boxes. The modification made by the user includes deleting one of the damage boxes. It is highly likely that a damage object in the deleted damage box is not damage, such as actually being stains or the like, or is not damage caused by this accident. It can be inferred accordingly that among other damage boxes, if a damage box similar to the deleted damage box exists, it should also be deleted, and damage boxes not similar thereto are kept. Therefore, in a specific embodiment, the modification made by the user includes deleting a first damage box in the damage identification result. Correspondingly, optimizing damage identification result can include: firstly, determining a plurality of similarities between a first damage box and a plurality of other damage boxes; and then using, as part of the optimized damage identification result, a damage box corresponding to a similarity less than a preset threshold among the plurality of similarities. Further, in a specific embodiment, determining similarities between damage boxes can include: firstly, determining feature vectors corresponding to the damage boxes, and then, using dot products of corresponding feature vectors as the similarities.

Figure 4D:
FIG. 4d shows an optimized damage identification result.

According to a specific example, the damage identification result includes the three damage boxes shown in FIG. 4b, and the user deletes "a moderate deformation on a right rear vehicle door" therein. Correspondingly, a similarity between a damage box (denoted as a damage box 1) with the damage classification being "a moderate deformation on a right rear vehicle door" and a damage box (denoted as a damage box 2) with the damage classification being "a moderate deformation on a wheel fender" and a similarity between the damage box (denoted as the damage box 1) with the damage classification being "a moderate deformation on a right rear vehicle door" and a damage box (denoted as a damage box 3) with the damage classification being "a mild scratch on a right rear vehicle door" can be separately calculated. Assuming that the calculated similarities are respectively 0.8 and 0.1, and a preset threshold is 0.7. Then, damage box 2 with the damage classification being "a moderate deformation on a wheel fender" can be deleted. The optimized damage identification result is shown in FIG. 4d. It can be seen that the similarity between damage box 2 and damage box 1 deleted by the user is high (in fact the two are both light reflection spots). In the situation where the user confirms damage box 1 not being true damage and therefore being deleted, after a damage optimization process, damage box 2 similar to damage box 1 is also deleted.

In another aspect, in the scenario where the user modifies the damage box by using more of other methods, then by using candidate damage boxes generated by the damage identification model in the damage identification result generation process, damage identification optimization can be carried out on the basis of the modification made by the user.

Generally, in order to identify a damage result, after extracting the image feature information, the damage identification model generates candidate damage boxes on the basis of the image feature information, and then determines, according to a preset determination criterion, at least part of the candidate damage boxes as damage boxes in the damage result. On this basis, in the situation where the user modifies the damage box, optimizing the damage identification result can include: firstly, acquiring candidate damage boxes generated by the damage identification model on the basis of the image feature information, the candidate damage boxes including damage boxes in the damage result; then, updating the candidate damage boxes on the basis of the modification made by the user to the damage boxes in the damage identification result; subsequently, for the updated candidate damage boxes, determining optimized damage boxes on the basis of similarities between the candidate damage boxes, and using the optimized damage boxes as part of the optimized damage identification result.

Further, according to a specific embodiment, determining the optimized damage box from the updated candidate damage boxes includes: firstly, determining a plurality of similarities between an arbitrary first candidate damage box in the updated candidate damage boxes and other candidate damage boxes; then, inputting the plurality of similarities into a predetermined prediction model, and according to an output result of the prediction model, determining whether the first candidate damage box is an abnormal box; then, if the first candidate damage box is not an abnormal box, including the first candidate damage box as part of the optimized damage box.

Further, in a specific embodiment, determining the plurality of similarities between an arbitrary first candidate damage box in the updated candidate damage boxes and the other candidate damage boxes includes: calculating a dot product of a first feature vector corresponding to the first candidate damage box and each of a plurality of other feature vectors corresponding to the plurality of other candidate damage boxes, and determining a plurality of dot product results as the plurality of similarities. In other embodiments, the similarities between the candidate damage boxes can also be determined on the basis of other mathematical operation, such as acquiring a difference vector, a distance, or the like, between the feature vectors of the candidate damage boxes.

Regarding extraction of the feature vectors of the candidate damage boxes, in one example, determining feature vectors corresponding to the candidate damage boxes can include: on the basis of a feature map included in the image feature information, extracting the feature vectors corresponding to the respective candidate damage boxes. In another example, determining feature vectors corresponding to the candidate damage boxes can include: acquiring, from pixel features of an original vehicle damage image, pixel features, such as RGB pixel values, corresponding to the candidate damage boxes, and then extracting feature vectors of the candidate damage boxes on the basis of these pixel features.

In a specific embodiment, the prediction model can be previously trained using positive samples and negative samples, and the trained prediction model is directly used as part of the LSTM. Further, the positive samples include a plurality of damage regions labeled as true damage; the negative samples include a plurality of damage regions labeled as true damage and at least one region labeled as false damage. It should be noted that the damage region and the false damage region can be understood as a region surrounded by a corresponding labeled damage box. In one example, the prediction model can be a linear regression model. In another specific embodiment, the prediction model can be trained jointly with other parts of the LSTM in a coordinated manner. That is, the training process of the LSTM includes determining parameters in the prediction model.

According to a specific example, the candidate damage boxes generated by the damage identification model include a damage box A, a damage box B, a damage box C, a damage box D, and a damage box E. Damage box A, damage box B, and damage box C are damage boxes in the damage result. In addition, the modification made by the user to the damage boxes includes: deleting damage box B, and reducing damage box C to acquire a damage box C'. Correspondingly, acquired updated candidate damage boxes include: damage box A, damage box C', damage box D, and damage box E. Then, similarities between damage box A and, respectively, damage box C', damage box D, and damage box E can be separately determined, and these three similarities can be inputted into the prediction model, so as to determine whether damage box A is an abnormal box. Similarly, it can also be separately determined whether damage box C', damage box D, and damage box E are abnormal boxes. Assuming that it is determined that damage box A, damage box C', and damage box D are not abnormal boxes but damage box E is an abnormal box, therefore, damage box A, damage box C', and damage box D can be used as part of the optimized damage result.

According to the foregoing, the attention mechanism is introduced in addition to the LSTM, so that the damage identification result is further optimized.

In view of the above, in the damage identification result optimization method provided by the embodiments of the specification, firstly, image feature information is extracted on the basis of a single damage determination image captured by a user, and a damage identification result is preliminarily identified; then, data of a modification made by the user to the damage identification result is received; further, on the basis of a previously trained LSTM, the extracted image feature information, the preliminarily acquired damage identification result, and the data of the modification made by the user are used as input to update the damage identification result. If the user is still unsatisfied with the updated damage identification result, another modification can be made, until the user is satisfied with the damage determination result.

The foregoing mainly discusses the damage identification result optimization method for a single damage determination image. Since a damage determination process generally involves a plurality of damage determination images, in addition to using the foregoing method to perform damage identification and damage identification result optimization on each of the plurality of damage determination images, the inventor thinks that information of association among the damage determination images can also be considered, so as to optimize damage identification results of the plurality of damage determination images together.

Figure 6:
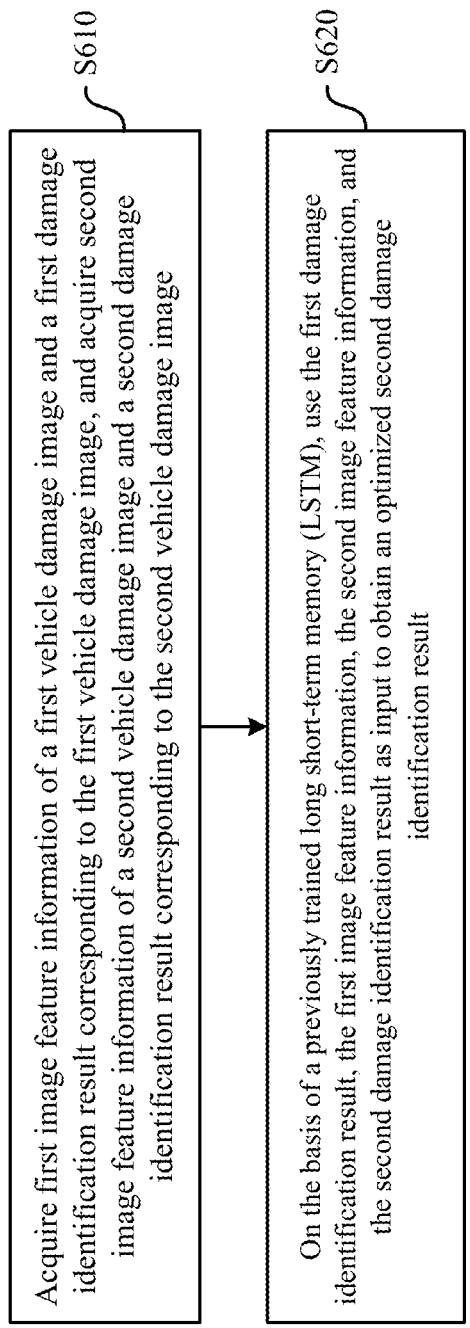
FIG. 6 shows a flowchart of a damage identification result optimization method according to an embodiment.

Similarly, considering that LSTM can process time sequence information, embodiments of the specification further provide a damage identification result optimization method for a plurality of images. FIG. 6 shows a flowchart of a damage identification result optimization method according to an embodiment. The executive body of the method can be a device having a processing capability: a server, a system, or an apparatus. For example, the device is a damage determination client. As shown in FIG. 6, a process of the method includes the following steps: step S610, acquire first image feature information of a first vehicle damage image and a first damage identification result corresponding to the first vehicle damage image, and acquire second image feature information of a second vehicle damage image and a second damage identification result corresponding to the second vehicle damage image; and step S620, on the basis of a previously trained long short-term memory (LSTM) network, use the first damage identification result, the first image feature information, the second image feature information, and the second damage identification result as input, and acquire an optimized second damage identification result. Execution of the aforementioned steps is introduced below.

Firstly, in step S610, acquire first image feature information of a first vehicle damage image and a first damage identification result corresponding to the first vehicle damage image, and acquire second image feature information of a second vehicle damage image and a second damage identification result corresponding to the second vehicle damage image.

In one embodiment, on the basis of a previously trained damage identification model, the first image feature information of the first vehicle damage image can be extracted, and the first damage identification result can be determined; the second image feature information of the second vehicle damage image can be extracted, and the second damage identification result can be determined. For descriptions of the damage identification model, the image feature information, and the damage identification result, reference can be made to the foregoing embodiments, and details will not be described herein again.

Further, in a specific embodiment, the acquired first damage identification result or second damage identification result can also be the damage identification result optimized on the basis of the method shown in FIG. 3. In one example, the first damage identification result is a damage identification result optimized on the basis of data of user interaction, and the second damage identification result is a damage identification result preliminarily determined on the basis of the damage identification model. Therefore, the second damage identification result can be optimized with reference to the first damage identification result, and then the optimized second damage identification result is displayed to the user.

Then, in step S620, on the basis of a previously trained long short-term memory (LSTM), using the first damage identification result, the first image feature information, the second image feature information, and the second damage identification result as input, and acquiring an optimized second damage identification result.

It should be noted that the previously trained LSTM involved herein is different from the previously trained LSTM mentioned in step S340. The previously trained LSTM in step S340 is used to optimize a damage determination result for a single damage determination image according to user's interaction data; however, the LSTM in this step is used to optimize a damage determination result of a current image according to a damage determination result of another image. It can be understood that these two LSTM are models that need to be trained separately. However, the two models can be used in a nested manner.

In one embodiment, the first image feature information and the first damage identification result can be used as initial input, and the second image feature information and the second damage identification result can be used as new input of a current time. The two parts of input are inputted into the previously trained LSTM together, so as to acquire the optimized second damage identification result. Similarly, by combining the LSTM and the attention mechanism, optimization of the second damage identification result is improved.

In one embodiment, the second damage identification result includes a first damage box; correspondingly, optimizing the second damage identification result can include: firstly, on the basis of a region matching and positioning algorithm, determining, from the first vehicle image, a matching region matching the first damage box; and then, optimizing a classification of the first damage box according to the matching region.

Figure 7A:
FIG. 7a shows an example of a vehicle damage image.
Figure 7B:
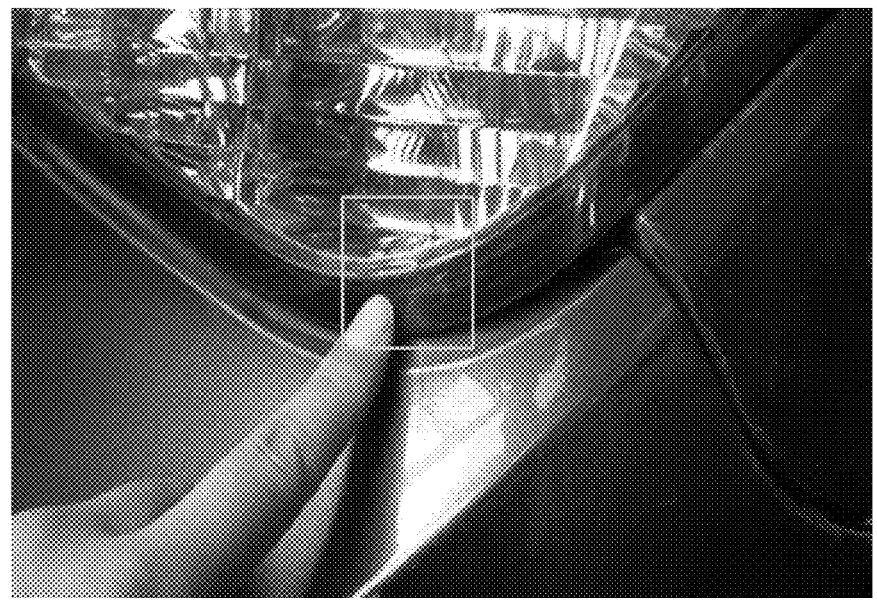
FIG. 7b shows an example of a damage identification result identified by a damage identification model.
Figure 7C:
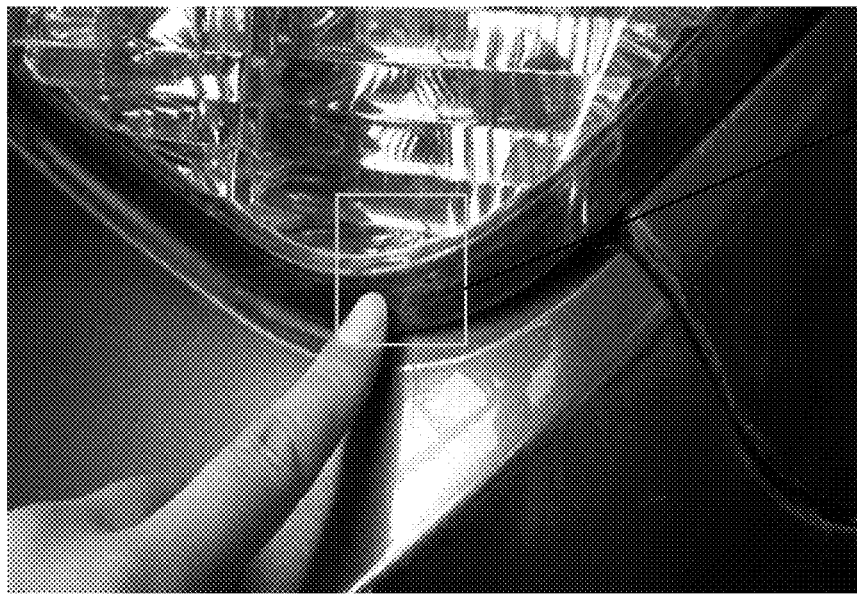
FIG. 7c shows an optimized damage identification result.

In a specific example, the user finds that damage to a vehicle light in FIG. 4d is not identified, and therefore, adds a close-up image of the vehicle light, as shown in FIG. 7a. In this case, the second damage identification result, namely the first damage box and the corresponding damage classification "vehicle light is broken," shown in FIG. 7b can be determined on the basis of the damage identification model. Therefore, the classification information indicating that the vehicle light is broken is identified from the image. However, it is not identified which vehicle light, such as a head light or a tail light, is broken. However, it can be learned from FIG. 4d that it is the right tail light. Specifically, optimizing the second damage identification result can include: firstly, on the basis of a region matching and positioning algorithm, determining, from the first vehicle image, a region matching the first damage box; and then, acquiring component information, namely right tail light, of the matching region acquired by means of identification performed on the basis of the image feature information, optimizing the classification of the first damage box into "right tail light is broken," and displaying the optimized damage identification result to the user, as shown in FIG. 7c.

It should be noted that after step S620, on one hand, the user can continue to capture vehicle damage images, or selectively delete captured vehicle damage images. On the basis of the user adding or deleting images, the damage identification result can be updated and optimized using the optimization method shown in FIG. 6. On the other hand, step S330 and step S340 shown in FIG. 3 can also be adopted. By receiving the modification made by the user to the second damage identification result, the second damage identification result is further optimized, until the user is satisfied with the second damage identification result.

In addition, after step S620, the optimized second damage identification result, the second image feature information, the first damage identification result, and the first image feature information can be used as input, so as to optimize the first damage identification result. That is, after the second damage identification result is optimized according to the first damage identification result, the first damage identification result can be optimized by using the optimized second damage identification result.

As in the aforementioned embodiment, optimizing the second damage identification result can include: firstly, on the basis of a region matching and positioning algorithm, determining, from the first vehicle image, a matching region matching the first damage box; and then, optimizing a classification of the first damage box according to the matching region.

Figure 7D:
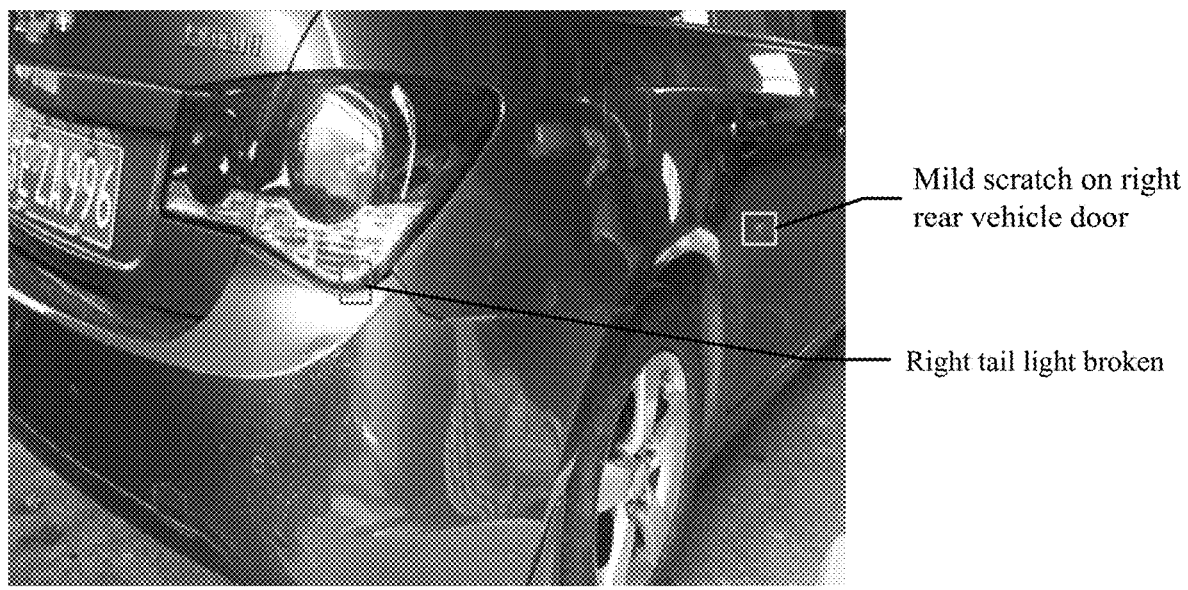
FIG. 7d shows an optimized damage identification result.

Further, optimizing the second damage identification result can include: optimizing at least one damage box in the first damage identification result according to the matching region. According to a specific example, as shown in FIG. 7c, the optimized second damage identification result includes a damage box with the classification "right tail light is broken." Therefore, the corresponding damage box can be labeled in the matching region matching the damage box in the first vehicle image. The optimized first damage identification result is shown in FIG. 7d.

In view of the above, the damage identification result optimization method provided by the embodiments of the specification can optimize a damage determination result of a current image with reference to a damage determination result of another image.

Figure 8:
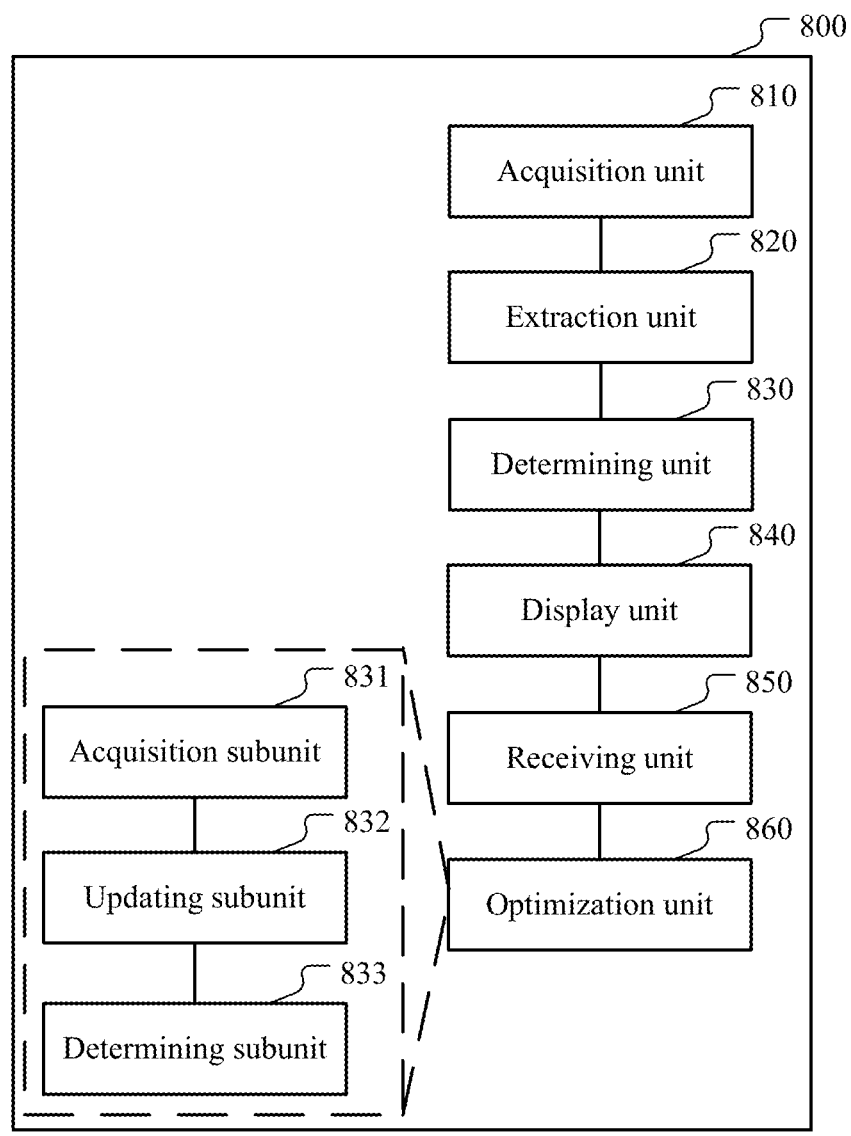
FIG. 8 shows a structural diagram of a damage identification result optimization apparatus according to an embodiment.

According to an embodiment of another aspect, an optimization apparatus is further provided, applied to processing of a single image. FIG. 8 shows a structural diagram of a damage identification result optimization apparatus according to an embodiment. Said apparatus 800 includes:

an acquisition unit 810, used to acquire a vehicle damage image inputted by a user;

an extraction unit 820, used to, on the basis of a previously trained damage identification model, extract image feature information;

a determining unit 830, used to determine a damage identification result corresponding to the vehicle damage image, the damage identification result including at least a damage box;

a display unit 840, used to display the damage identification result to the user;

a receiving unit 850, used to receive a modification made by a user on the basis of the damage identification result; and an optimization unit 860, used to, on the basis of a previously trained long short-term memory (LSTM) network, use the damage identification result, the image feature information, and the modification as input to obtain the optimized damage identification result.

In one embodiment, the damage identification model in the extraction unit is previously trained based on the following steps:

acquiring a plurality of historical vehicle damage images labeled with damage identification results; and on the basis of a convolutional neural network (CNN), using the plurality of historical vehicle damage images as training samples to train the damage identification model.

In one embodiment, the damage identification result further includes a damage classification corresponding to the damage box; the modification includes modifying the damage box and/or modifying the damage classification; wherein modifying the damage box includes at least one of deleting, adding, moving, reducing, and amplifying.

Further, according to one aspect, in a specific embodiment, the modification includes modifying the damage box; optimization unit 860 specifically includes:

an acquisition subunit 861, used to, according to the image feature information, acquire candidate damage boxes generated by the damage identification model to acquire the damage identification result, the candidate damage boxes including a damage box in the damage result;

an updating subunit 862, used to, on the basis of the modification, update the candidate damage boxes; and a determining subunit 863, used to, for the updated candidate damage boxes, on the basis of similarities among the candidate damage boxes, determine an optimized damage box, and use the optimized damage box as part of the optimized damage identification result.

Further, in an example, determining subunit 863 is specifically used to:

determine a plurality of similarities between an arbitrary first candidate damage box in the updated candidate damage boxes and the other candidate damage boxes;

input the plurality of similarities into a predetermined prediction model, and according to an output result of the prediction model, determine whether the first candidate damage box is an abnormal box, the prediction model included in the LSTM; and if the first candidate damage box is not an abnormal box, use the first candidate damage box as part of the optimized damage box.

Further, in an example, determining subunit 863 is specifically used to determine the plurality of similarities between an arbitrary first candidate damage box in the updated candidate damage boxes and the other candidate damage boxes, including:

Calculating a dot product of a first feature vector corresponding to the first candidate damage box and each of a plurality of other feature vectors corresponding to the plurality of other candidate damage boxes, and determining a plurality of dot product results as the plurality of similarities.

In another example, the prediction model is previously trained using positive samples and negative samples; the positive samples include a plurality of damage regions labeled as true damage; the negative samples include a plurality of damage regions labeled as true damage and at least one region labeled as false damage.

In another example, the prediction model is a linear regression model.

According to another aspect, in a specific embodiment, the damage identification result includes a plurality of damage boxes; the plurality of damage boxes include a first damage box; the modification includes deleting the first damage box; optimization unit 860 is specifically used to:

determine a plurality of similarities between the first damage box and a plurality of other damage boxes; and use, as part of the optimized damage identification result, a damage box corresponding to a similarity less than a preset threshold among the plurality of similarities.

In view of the above, in the damage identification result optimization apparatus provided by the embodiments of the specification, firstly, image feature information is extracted on the basis of a single damage determination image captured by a user, and a damage identification result is preliminarily identified; then, data of a modification made by the user to the damage identification result is received; further, on the basis of a previously trained LSTM, the extracted image feature information, the preliminarily identified damage identification result, and the data of the modification made by the user are used as input to update the damage identification result. If the user is still unsatisfied with the updated damage identification result, another modification can be made until the user is satisfied with the damage determination result.

Figure 9:
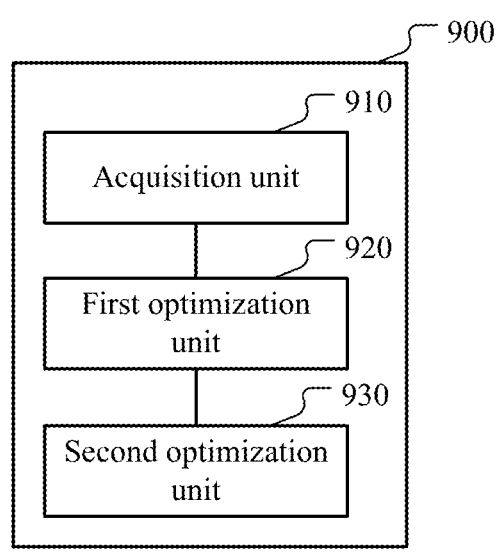
FIG. 9 shows a structural diagram of a damage identification result optimization apparatus according to an embodiment.

According to one embodiment of another aspect, an optimization apparatus is further provided, applied to processing of a plurality of images. FIG. 9 shows a structural diagram of a damage identification result optimization apparatus according to an embodiment. As shown in FIG. 9, apparatus 900 includes:

an acquisition unit 910, used to acquire first image feature information of a first vehicle damage image and a first damage identification result corresponding to the first vehicle damage image, and acquire second image feature information of a second vehicle damage image and a second damage identification result corresponding to the second vehicle damage image; and a first optimization unit 920, used to, on the basis of a previously trained long short-term memory (LSTM) network, use the first damage identification result, the first image feature information, the second image feature information, and the second damage identification result as input to obtain an optimized second damage identification result.

In one embodiment, the first image feature information and the second image feature information are separately extracted on the basis of a previously trained damage identification model.

In one embodiment, the first damage identification result and the second damage identification result are separately determined on the basis of a previously trained damage identification model, or are separately determined on the basis of the method shown in FIG. 3.

In one embodiment, the second damage identification result includes a first damage box; the first optimization unit 920 is specifically used to:

on the basis of a region matching and positioning algorithm, determine, from the first vehicle image, a matching region matching the first damage box; and optimize a classification of the first damage box according to the matching region.

In one embodiment, the apparatus further includes:

a second optimization unit 930, used to use the optimized second damage identification result, the second image feature information, the first damage identification result, and the first image feature information as input to acquire an optimized first damage identification result.

Further, in a specific embodiment, the second damage identification result includes a first damage box; the first optimization unit 920 is specifically used to:

on the basis of a region matching and positioning algorithm, determine, from the first vehicle image, a matching region matching the first damage box; and optimize a classification of the first damage box according to the matching region.

The second optimization unit 930 is specifically used to: optimize at least one damage box in the first damage identification result according to the matching region.

In view of the above, the damage identification result optimization apparatus provided by the embodiments of the specification can optimize a damage determination result of a current image with reference to a damage determination result of another image.

According to an embodiment of another aspect, a computer-readable storage medium is further provided, on which a computer program is stored, wherein the computer program, when executed on a computer, causes the computer to perform the method described with reference to FIG. 3 or FIG. 6.

According to an embodiment of another aspect, a computing device is further provided, including a memory and a processor, wherein the memory stores executable code, and the processor, when executing the executable code, implements the method described with reference to FIG. 3 or FIG. 6.

Figure 10:
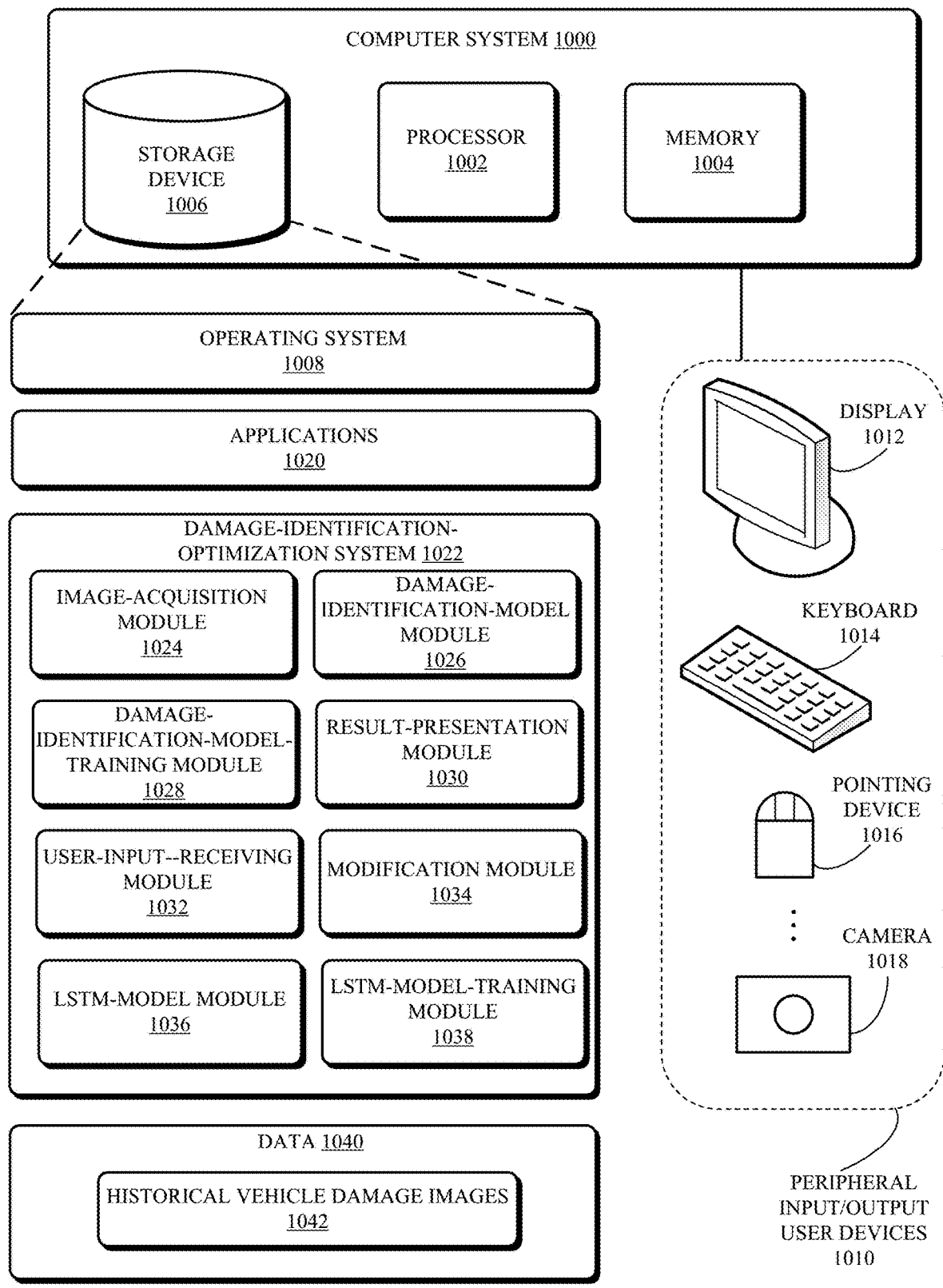
FIG. 10 illustrates an exemplary computer and communication system for optimizing damage identification result according to an embodiment.

FIG. 10 illustrates an exemplary computer and communication system for optimizing damage identification result according to one embodiment. In FIG. 10, computer system 1000 can include a processor 1002, a memory 1004, and a storage device 1006. Furthermore, computer system 1000 can be coupled to peripheral input/output (I/O) user devices 1010, e.g., a display device 1012, a keyboard 1014, a pointing device 1016, and a camera 1018. Storage device 1006 can store an operating system 1008, one or more applications 1020, a damage-identification-optimization system 1022, and data 1040.

Applications 1020 can include instructions, which can be loaded from storage device 1006 into memory 1004 and executed by processor 1002. As a result, computer system 1000 can perform specific functions provided by applications 1020.

Damage-identification-optimization system 1022 can include instructions, which when executed by computer system 1000, can cause computer system 1000 or processor 1002 to perform methods and/or processes described in this disclosure. Specifically, damage-identification-optimization system 1022 can include instructions for acquiring (e.g., via camera 1018) a vehicle damage image (image-acquisition module 1024), instructions for implementing a damage-identification model (damage-identification-model module 1026), instructions for training the damage-identification model using historical vehicle damage images (damage-identification-model-training module 1028), instructions for presenting (e.g., via a user interface) the damage-identification result to the user (result-presentation module 1030), instructions for receiving (e.g., via the user interface) user input (user-input-receiving module 1032), instructions for modifying the damage-identification result based on the user input (modification module 1034), instructions for implementing an LSTM model (LSTM-model module 1036), and instructions for training the LSTM model (LSTM-model-training module 1038).

Data 1040 can include historical vehicle damage images 1042. Such images can be used to train the damage-identification module and the LSTM model.

In some embodiments, applications 1020 and the various modules in sample-labeling system 1022, such as modules 1024, 1026, 1028, 1030, 1032, 1034, 1036, and 1038 can be partially or entirely implemented in hardware and can be part of processor 1002. Further, in some embodiments, the system may not include a separate processor and memory. Instead, in addition to performing their specific tasks, modules 1020, 1024, 1026, 1028, 1030, 1032, 1034, 1036, and 1038 either separately or in concert, may be part of general- or special-purpose computation engines.

Figure 11:
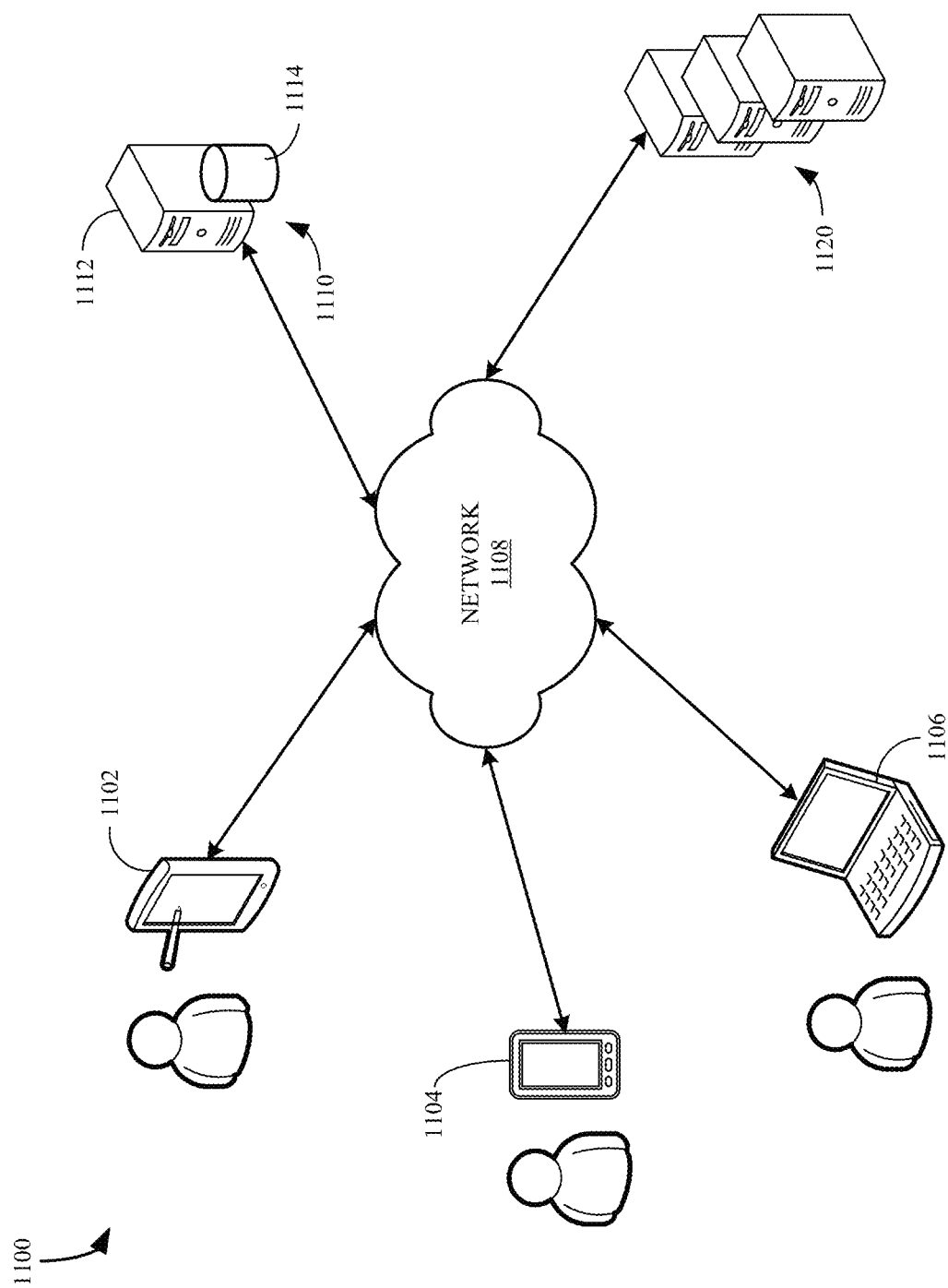
FIG. 11 illustrates an exemplary network environment for implementing the disclosed technology, in accordance with some embodiments described herein.

FIG. 11 illustrates an exemplary network environment for implementing the disclosed technology, in accordance with some embodiments described herein. A network environment 1100 includes a number of electronic devices 1102, 1104 and 1106 communicably connected to a server 1110 by a network 1108. One or more remote servers 1120 are further coupled to the server 1110 and/or the one or more electronic devices 1102, 1104 and 1106.

In some exemplary embodiments, electronic devices 1102, 1104 and 1106 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 1102, 1104 and 1106 store a user agent such as a browser or application. In the example of FIG. 11, electronic device 1102 is depicted as a tablet computer, electronic device 1104 is depicted as a smartphone, and electronic device 1106 is depicted as a laptop computer.

Server 1110 includes a processing device 1112 and a data store 1114. Processing device 1112 executes computer instructions stored in data store 1114, for example, to assist in scheduling a customer-initiated service or a service-provider-initiated service between a service provider and a customer at electronic devices 1102, 1104 and 1106 during a service scheduling process.

In some exemplary aspects, server 1110 can be a single computing device such as a computer server. In other embodiments, server 1110 can represent more than one computing device working together to perform the actions of a server computer (e.g., cloud computing). The server 1110 may host the web server communicably coupled to the browser at the client device (e.g., electronic devices 1102, 1104 or 1106) via network 1108. In one example, the server 1110 may host a client application for scheduling a customer-initiated service or a service-provider-initiated service between a service provider and a customer during a service scheduling process. Server 1110 may further be in communication with one or more remote servers 1120 either through the network 1108 or through another network or communication means.

The one or more remote servers 1120 may perform various functionalities and/or storage capabilities described herein with regard to the server 1110, either alone or in combination with server 1110. Each of the one or more remote servers 1120 may host various services. For example, servers 1120 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 1120 can be a single computing device such as a computer server or can represent more than one computing device working together to perform the actions of a server computer (e.g., cloud computing). In one embodiment server 1110 and one or more remote servers 1120 may be implemented as a single server or a cluster of servers. In one example, server 1110 and one or more remote servers 1120 may communicate through the user agent at the client device (e.g., electronic devices 1102, 1104 or 1106) via network 1108.

Users may interact with the system hosted by server 1110, and/or one or more services hosted by remote servers 1120, through a client application installed at the electronic devices 1102, 1104, and 1106. Alternatively, the user may interact with the system through a web-based browser application at the electronic devices 1102, 1104, and 1106. Communication among client devices 1102, 1104, 1106 and the system, and/or one or more services, may be facilitated through a network (e.g., network 1108).

Communication among the client devices 1102, 1104, 1106, server 1110 and/or one or more remote servers 1120 may be facilitated through various communication protocols. In some aspects, client devices 1102, 1104, 1106, server 1110 and/or one or more remote servers 1120 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 1108 can include, for example, any one or more of a personal area network (PAN), a local area network (LAN), a campus area network (CAN), a metropolitan area network (MAN), a wide area network (WAN), a broadband network (BBN), the Internet, and the like. Further, network 1108 can include, but is not limited to, any one or more of the following network topologies, including a bus network, a star network, a ring network, a mesh network, a star-bus network, a tree or hierarchical network, and the like.

A person skilled in the art may be aware that in the aforementioned one or plurality of examples, the functions described in the plurality of embodiments disclosed in the specification can be implemented by hardware, software, firmware, or any combination thereof. When implemented by software, these functions may be stored in a computer-readable medium, or transmitted as one or a plurality of instructions or as one or a plurality of pieces of code in the computer-readable medium.

The objectives, the technical solutions, and the beneficial effects of the plurality of embodiments disclosed in the specification are further described in detail in the foregoing specific implementation. It should be understood that the foregoing descriptions are merely specific implementation of the plurality of embodiments disclosed in the specification, and are not intended to limit the protection scope of the plurality of embodiments disclosed in the specification. Any modification, equivalent replacement, and improvement made on the basis of the technical solutions of the plurality of embodiments disclosed in the specification shall fall within the protection scope of the specification.

What is claimed is:

1. A computer-executed method for vehicle damage identification, the method comprising:
   obtaining, by a computer, a vehicle image;
   generating, based on a damage identification model and the obtained vehicle image, an initial damage identification result, which indicates at least a location of identified vehicle damage;
   displaying the initial damage identification result;
   receiving a modification to the initial damage identification result; and
   generating an updated damage identification result by inputting the damage identification result, image feature information extracted from the vehicle image, and the received modification to a long short-term memory (LSTM) model.

2. The method according to claim 1, wherein the damage identification model comprises a convolutional neural network (CNN), and wherein the method further comprises:
   obtaining a plurality of historical vehicle images labeled with damage identification results; and
   using the plurality of historical vehicle images as training samples to train the CNN.

3. The method according to claim 1, wherein the initial damage identification result further comprises a damage classification corresponding to the identified vehicle damage; wherein the modification comprises modifying a damage box associated with the identified vehicle damage and/or modifying the damage classification; and wherein modifying the damage box comprises at least one of: deleting, adding, moving, reducing, and amplifying the damage box.

4. The method according to claim 3, wherein the modification comprises modifying the damage box; and wherein generating the updated damage identification result comprises:
   generating, based on the damage identification model, candidate damage boxes;
   modifying the candidate damage boxes based on the received modification; and
   determining updated damage boxes based on similarities among the candidate damage boxes.

5. The method according to claim 4, wherein determining the updated damage box comprises:
   selecting an arbitrary first candidate damage box from the modified candidate damage boxes;
   determining a plurality of similarities between the selected arbitrary first candidate damage box and other candidate damage boxes in the modified candidate damage boxes;
   determining whether the first candidate damage box is abnormal based on a prediction model comprised in the LSTM; and
   in response to the first candidate damage box being not abnormal, including the first candidate damage box in the updated damage boxes.

6. The method according to claim 5, wherein determining the plurality of similarities between the selected arbitrary first candidate damage box and other candidate damage boxes comprises:
   calculating a dot product of a first feature vector corresponding to the first candidate damage box and each of a plurality of other feature vectors corresponding to the plurality of other candidate damage boxes.

7. The method according to claim 5, further comprising training the prediction model using positive samples and negative samples; wherein the positive samples comprise a plurality of damage regions labeled as true damage; and wherein the negative samples comprise a plurality of damage regions labeled as true damage and at least one region labeled as false damage.

8. The method according to claim 5, wherein the prediction model is a linear regression model.

9. The method according to claim 3, wherein the initial damage identification result comprises a plurality of damage boxes associated with identified vehicle damage; wherein the received modification comprises deleting a first damage box from the plurality of damage boxes; and wherein generating the updated damage identification result comprises:
   determining a plurality of similarities between the first damage box and a plurality of other damage boxes; and
   in response to determining that a similarity corresponding to a second damage box is less than a predetermined threshold, including the second damage box in the updated damage identification result.

10. The method according to claim 1, further comprising:
    obtaining first image feature information of a first vehicle image and a first damage identification result corresponding to the first vehicle image;
    obtaining second image feature information of a second vehicle image and a second damage identification result corresponding to the second vehicle image; and further updating the second damage identification result by inputting the first damage identification result, the first image feature information, the second image feature information, and the second damage identification result to the LSTM model.

11. The method according to claim 10, wherein the first image feature information and the second image feature information are separately extracted using the damage identification model.

12. The method according to claim 10,
wherein the first damage identification result and the second damage identification result are initial damage identification results separately determined based on the damage identification model; or
wherein the first damage identification result and the second damage identification result are updated damage identification results separately determined based on the LSTM model.

13. The method according to claim 10, wherein the second damage identification result comprises a first damage box; and wherein further updating the second damage identification result comprises:
performing a region matching and positioning operation to determine, from the first vehicle image, a matching region matching the first damage box; and
updating a classification of the first damage box according to the matching region.

14. The method according to claim 10, further comprising:
further updating the first damage identification result by inputting the updated second damage identification result, the second image feature information, the first damage identification result, and the first image feature information to the LSTM model.

15. The method according to claim 14, wherein the second damage identification result comprises a first damage box, wherein further updating the second damage identification result comprises:
performing a region matching and positioning algorithm to determining, from the first vehicle image, a matching region matching the first damage box; and
updating a classification of the first damage box according to the matching region;
wherein further updating the first damage identification result comprises: updating at least one damage box in the first damage identification result according to the matching region.

16. A computer system for damage identification, the computer system comprising:
a processor; and
a storage device coupled to the processor and storing instructions, which when executed by the processor cause the processor to perform a method, the method comprising:
obtaining a vehicle image;
generating, based on a damage identification model and the obtained vehicle image, an initial damage identification result, which indicates a location of identified vehicle damage;
displaying the initial damage identification result;
receiving a modification to the initial damage identification result; and
generating an updated damage identification result by inputting the damage identification result, image feature information extracter from the vehicle image, and the received modification to a long short-term memory (LSTM) model.

17. The computer system according to claim 16, wherein the damage identification model comprises a convolutional neural network (CNN), and wherein the damage identification model is trained by:
obtaining a plurality of historical vehicle images labeled with damage identification results; and
using the plurality of historical vehicle images as training samples to train the CNN.

18. The computer system according to claim 16, wherein the initial damage identification result further comprises a damage classification corresponding to the identified vehicle damage; wherein the modification comprises modifying a damage box associated with the identified vehicle damage and/or modifying the damage classification; and wherein modifying the damage box comprises at least one of: deleting, adding, moving, reducing, and amplifying.

19. The computer system according to claim 18, wherein the modification comprises modifying the damage box; and wherein generating the updated damage identification result comprises:
generating, based on the damage identification model, candidate damage boxes;
modifying the candidate damage boxes based on the received modification; and
determining updated damage boxes based on similarities among the candidate damage boxes.

20. The computer system according to claim 19, wherein determining the updated damage boxes comprises:
selecting an arbitrary first candidate damage box from the modified candidate damage boxes;
determining a plurality of similarities between the selected arbitrary damage box and other candidate damage boxes in the modified candidate damage boxes;
determining whether the first candidate damage box is abnormal based on a prediciton model comprised in the LSTM; and
in response to the first candidate damage box being not abnormal, including the first candidate damage box in the updated damage boxes.

21. The computer system according to claim 20, wherein determining a plurality of similarities between the selected arbitrary first candidate damage box and other candidate damage boxes comprises:
calculating a dot product of a first feature vector corresponding to the first candidate damage box and each of a plurality of other feature vectors corresponding to the plurality of other candidate damage boxes.

22. The computer system according to claim 20, wherein the prediction model is trained using positive samples and negative samples; wherein the positive samples comprise a plurality of damage regions labeled as true damage; and wherein the negative samples comprise a plurality of damage regions labeled as true damage and at least one region labeled as false damage.

23. The computer system according to claim 20, wherein the prediction model is a linear regression model.

24. The computer system according to claim 18, wherein the initial damage identification result comprises a plurality of damage boxes; wherein the received modification comprises deleting a first damage box from the plurality of damage boxes; and wherein generating the updated damage identification result comprises:
determining a plurality of similarities between the first damage box and a plurality of other damage boxes; and
in response to determining that a similarity corresponding to a second damage box is less than a predetermined threshold, including the second damage box in the updated damage identification result.

25. The computer system according to claim 16, wherein the method further comprises:
obtaining first image feature information of a first vehicle image and a first damage identification result corresponding to the first vehicle image; and
obtaining a second image feature information of a second vehicle image and a second damage identification result corresponding to the second vehicle image; and
further updating the second damage identification result by inputting the first damage identification result, the first image feature information, the second image feature information, and the second damage identification result to the LSTM model.

26. The computer system according to claim 25, wherein the first image feature information and the second image feature information are separately extracted using the damage identification model.

27. The comptuer system according to claim 25, wherein the first damage identification result and the second damage identification result are initial damage identification results separately determined based on the damage identification model; or
wherein the first damage identification result and the second damage identification result are updated damage identification results separately determined based on the LSTM model.

28. The computer system according to claim 25, wherein the second damage identification result comprises a first damage box; and wherein further updating the second damage identification result comprises:
performing a region matching and positioning operation to determine, from the first vehicle image, a matching region matching the first damage box; and
updating a classification of the first damage box according to the matching region.

29. The computer system according to claim 25, wherein the method further comprises:
further updating the first damage identification result by inputting the further updated second damage identification result, the second image feature information, the first damage identification result, and the first image feature information to the LSTM model.

30. The computer system according to claim 29,
wherein the second damage identification result comprises a first damage box;
wherein further updating the second damage identification result comprises:
performing a region matching and positioning algorithm to determining, from the first vehicle image, a matching region matching the first damage box; and
updating a classification of the first damage box according to the matching region; and
wherein further updating the first damage identification result comprises updating at least one damage box in the first damage identification result according to the matching region.

* * * * *

UNITED STATES PATENT AND TRADEMARK OFFICE
CERTIFICATE OF CORRECTION

PATENT NO. : 11,069,052 B2
APPLICATION NO. : 17/156198
DATED : July 20, 2021
INVENTOR(S) : Juan Xu It is certified that error appears in the above-identified patent and that said Letters Patent is hereby corrected as shown below:

In the Claims

Claim 16, Column 21, Line 65 "extracter" should read "extracted"
Claim 20, Column 22, Line 33 should read "selected arbritrary first candidate damage box and other candidate"
      Column 22, Line 36 "prediciton" should read "prediction"
Claim 25, Column 23, Line 08 should read "obtaining second image feature information of a second"
Claim 27, Column 23, Line 20 "comptuer" should read "computer"

Signed and Sealed this
Twenty-seventh Day of June, 2023

Katherine Kelly Vidal
*Director of the United States Patent and Trademark Office*